United States Patent [19]
Amro et al.

[11] Patent Number: 5,867,678
[45] Date of Patent: Feb. 2, 1999

[54] METHOD AND SYSTEM FOR SEARCHING AND RETRIEVING SPECIFIC TYPES OF OBJECTS CONTAINED WITHIN A COMPOUND DOCUMENT

[75] Inventors: Hatim Yousef Amro, Austin; Dan Lee Dao, Cedar Park; John Paul Dodson, Pflugerville, all of Tex.

[73] Assignee: International Business Machines Corporation, Armonk, N.Y.

[21] Appl. No.: 771,349

[22] Filed: Dec. 16, 1996

[51] Int. Cl.$^6$ ........................................ G06F 3/14
[52] U.S. Cl. ..................... 345/347; 345/341; 345/340
[58] Field of Search ..................... 395/341, 157, 395/347, 159, 133; 345/340, 348, 349, 341, 347, 433

[56] References Cited

U.S. PATENT DOCUMENTS

| | | | |
|---|---|---|---|
| 5,339,391 | 8/1994 | Wroblewski et al. | 395/157 |
| 5,506,951 | 4/1996 | Ishikawa | 395/157 |
| 5,530,796 | 6/1996 | Wang | 395/156 |
| 5,550,969 | 8/1996 | Torres et al. | 395/159 |
| 5,680,561 | 10/1997 | Amro et al. | 395/341 |
| 5,737,507 | 4/1998 | Smith | 395/133 |

*Primary Examiner*—Raymond J. Bayerl
*Assistant Examiner*—Cuong T. Thai
*Attorney, Agent, or Firm*—Richard A. Henkler; Kermit D. Lopez; Andrew J. Dillon

[57] ABSTRACT

A method and system for retrieving specific types of objects contained within a compound document displayed in a graphical user interface environment within the data processing system. First, in response to user input, a dialog box which includes a listing of object types is displayed within the graphical user interface environment. Next, an object type is selected from among the listing of object types. Thereafter, in response to the selection of the object type, the graphical user interface dynamically searches for the relative location of a first object of the selected object type from among a sequential number of objects of the selected object type contained within the compound document. Next, in response to user controls, the graphical user interface automatically scrolls to the relative location within the compound document of the first object of the selected object type. Thereafter, in response to user controls, the graphical user interface can automatically scroll to the relative location within the compound document of a next or previous object of the selected object type. In addition the dialog box can include colors associated with each object type which can be altered by the graphical user interface user.

19 Claims, 7 Drawing Sheets

METHOD AND SYSTEM FOR SEARCHING AND RETRIEVING SPECIFIC TYPES OF OBJECTS CONTAINED WITHIN A COMPOUND DOCUMENT

CROSS-REFERENCE TO RELATED APPLICATIONS

The present invention is related to co-pending applications, Ser. No. 08/748,218, IBM Docket No. AT9-96-167, and Ser. No. 08/748,221, IBM Docket No. AT9-96-225, both assigned to the assignee herein named and filed of even date herewith.

BACKGROUND OF THE INVENTION

1. Technical Field

The invention relates in general to data processing systems and to computer systems and computer displays that include data display regions which display portions of a stored date file such as a compound document. In particular, the invention relates to a graphical user interface for retrieving an object within a compound document. More particularly, the invention relates to a graphical user interface for directing a data processing system to retrieve specific types of objects in a compound document.

2. Description of the Related Art

A graphical user interface is a type of display format that enables a user to choose commands, start programs, and see lists of files and other options by pointing to pictorial representations (icons) and lists of menu items on the screen. Choices can generally be activated by either a keyboard or a mouse.

For application developers, graphical user interfaces offer environments that handle direct interaction with the computer. Such environments free the developer to concentrate on a given application without becoming entangled in the details of a screen display or mouse and keyboard input. A graphical user interface also enables programmers to create programs to handle frequently performed tasks, such as saving a data file. The interface itself provides standard controlling mechanisms such as windows and dialog boxes. Another benefit of graphical user interfaces is that applications written for graphical user interfaces are device independent: as the graphical user interface changes to support new input and output devices, such as a large screen monitor or an optical storage device, the applications can, without modification, use those devices.

Some conventional graphical user interfaces provide a scroll bar for scrolling through pages of a document. In many types of graphical user interfaces, a vertical or horizontal bar at the side or bottom of a graphical user interface window can be utilized in conjunction with a pointing device (e.g., a mouse) for moving about in a compound document. Scrolling permits viewing of any desired portion of a document and is so named because it is the electronic equivalent of reading through a rolled (scrolled) document rather than flipping through pages of a book. A computer keyboard provides a number of "scroll-control" keys, such as the up, down, left, and right arrow keys. Application programs often offer additional methods of scrolling—for example, combing the "control" and "page up" keys to move to the beginning of a document.

Scroll bars typically are utilized in graphical user interfaces to accomplish scrolling tasks. A vertical or horizontal bar at the side or bottom of a window that can be used with a mouse for moving around in a document can be utilized in a typical scrolling task. For example, software word processing programs commercially available typically use two scroll bars for scrolling through pages of a document. Typically, a vertical scroll bar is used to control movement or to scroll through lines and pages of a document, while a horizontal scroll bar controls movement through words in a line.

Such conventional scroll bar systems usually comprise two arrows and a slider. Each arrow controls which direction a user desires to scroll through a document. An arrow conventionally controls movement through a document in small increments or small blocks of information, such as individual lines or a page of a document, for example. Moreover, if an arrow points in the upward direction, the document will be scrolled from its present position in the document toward the first page. If an arrow points in the downward position, the document will be scrolled from its present position in a document toward the last page of the document.

A slider is conventionally used to control movement through a document in larger increments than when the arrows are used. Instead of incrementing by small blocks of information, the slider typically controls movement through a document in larger blocks, increments or groups of information, such as two or more pages, for example. Therefore, when a user desires to go from the first page to the fiftieth page, the slider is usually selected and moved until page fifty is selected. The term "elevator" is also utilized to describe such a slider.

A document having multiple objects capable of running within the document such as spreadsheets, text, hotlinks, pictures, sounds, and video objects is a compound document. Within such a compound document are objects. An example of an object is a graphic or spreadsheet or a collection of text. In conventional graphical user interface window environments, a typical window will display a portion (e.g., a page) of a compound document. The size and position of the elevator within a window scroll bar corresponds to the size and position of the current viewable object in relation to the compound document. Because the compound document includes too many objects to view simultaneously, the user can position a mouse cursor over an arrow section of the window scroll bar and click a pointing device (e.g., a mouse) to scroll the document upward or downward, as appropriate.

Some objects in a compound document do not have text associated with them, and in turn cannot normally be searched. In practice, such documents are typically located with a "hit and miss" strategy. The user guesses where such objects reside in the compound document and may actually arrive close to the actual location. However, the user is forced to sequentially search the actual pages of the compound document for the specific object. It is desirable to have a reliable and efficient technique to retrieve objects in a compound document. It is also desirable to have a reliable and efficient technique for retrieving specific types of objects in a compound document. For example, a graphical user interface user may wish to specifically retrieve all graphic objects within a compound document. Thus, a need exists for an efficient method and system for retrieving specific types of objects within a compound document, such as graphic objects, spreadsheets, etc.

SUMMARY OF THE INVENTION

It is therefore an object of the invention to provide for a graphical user interface used in a data processing system.

It is another object of the invention to provide a graphical user interface for retrieving objects within a compound document.

It is another object of the invention to provide a graphical user interface for directing a data processing system to mark and subsequently retrieve specific types of objects contained within a compound document.

The above and other objects are achieved as is now described. A method and system for retrieving specific types of objects contained within a compound document displayed in a graphical user interface environment within the data processing system. First, in response to user input, a dialog box which includes a listing of object types is displayed within the graphical user interface environment. Next, an object type is selected from among the listing of object types. Thereafter, in response to the selection of the object type, the graphical user interface dynamically searches for the relative location of a first object of the selected object type from among a sequential number of objects of the selected object type contained within the compound document. Next, in response to user controls, the graphical user interface automatically scrolls to the relative location within the compound document of the first object of the selected object type. Thereafter, in response to user controls, the graphical user interface can automatically scroll to the relative location within the compound document of a next or previous object of the selected object type. In addition the dialog box can include colors associated with each object type which can be altered by the graphical user interface user.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
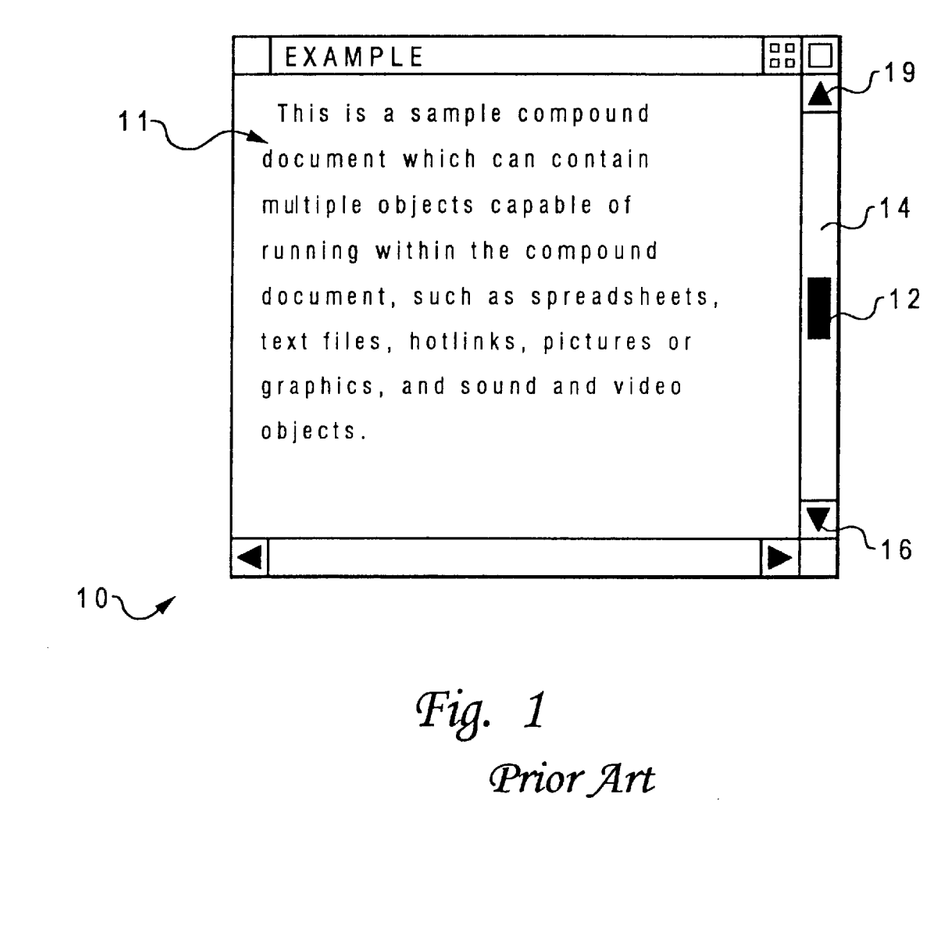
FIG. 1 depicts a sample compound document enclosed within a graphical user interface window having a scroll bar and elevator which can be utilized in accordance with the method and system of the present invention.

With reference now to the figures and in particular with reference to FIG. 1, there is depicted a pictorial view of a window 10 that is controlled by a conventional graphical user interface which may be utilized to implement the method and system of the present invention. Window 10 displays a portion of a compound document. A compound document 11 contains multiple objects capable of running within the document, such as a spreadsheet, text, hotlink, picture, sound, and video objects. The size and position of elevator 12 within scroll bar 14 corresponds to the size and position of the current viewable page in relation to compound document 11. In the example window depicted in FIG. 1, because the compound document includes too many pages to view simultaneously, the user can position a mouse cursor over arrow section 19 or arrow section 16 of scroll bar 14 and click a pointing device (e.g., a mouse) to scroll the document upward or downward, as appropriate. Scrolling in this manner permits viewing of any desired portion of the compound document. Scrolling is the electronic equivalent of reading through a rolled (i.e., "scrolled") document rather than flipping through pages of a book.

In FIG. 1, The graphical user interface sizes elevator 12 within scroll bar 14 according to the number of pages in the compound document. The length of elevator 12 is small with respect to the length of scroll bar 14 because it represents one of many pages of the compound document. Similarly, the graphical user interface positions elevator 12 within scroll bar 14 relative to the viewable position of the compound document. For example, the graphical user interface positions elevator 12 at the top of scroll bar 14 when the user is viewing the first page of the compound document, and at the bottom of scroll bar 14 when the user is viewing the last page of the compound document.

Figure 2:
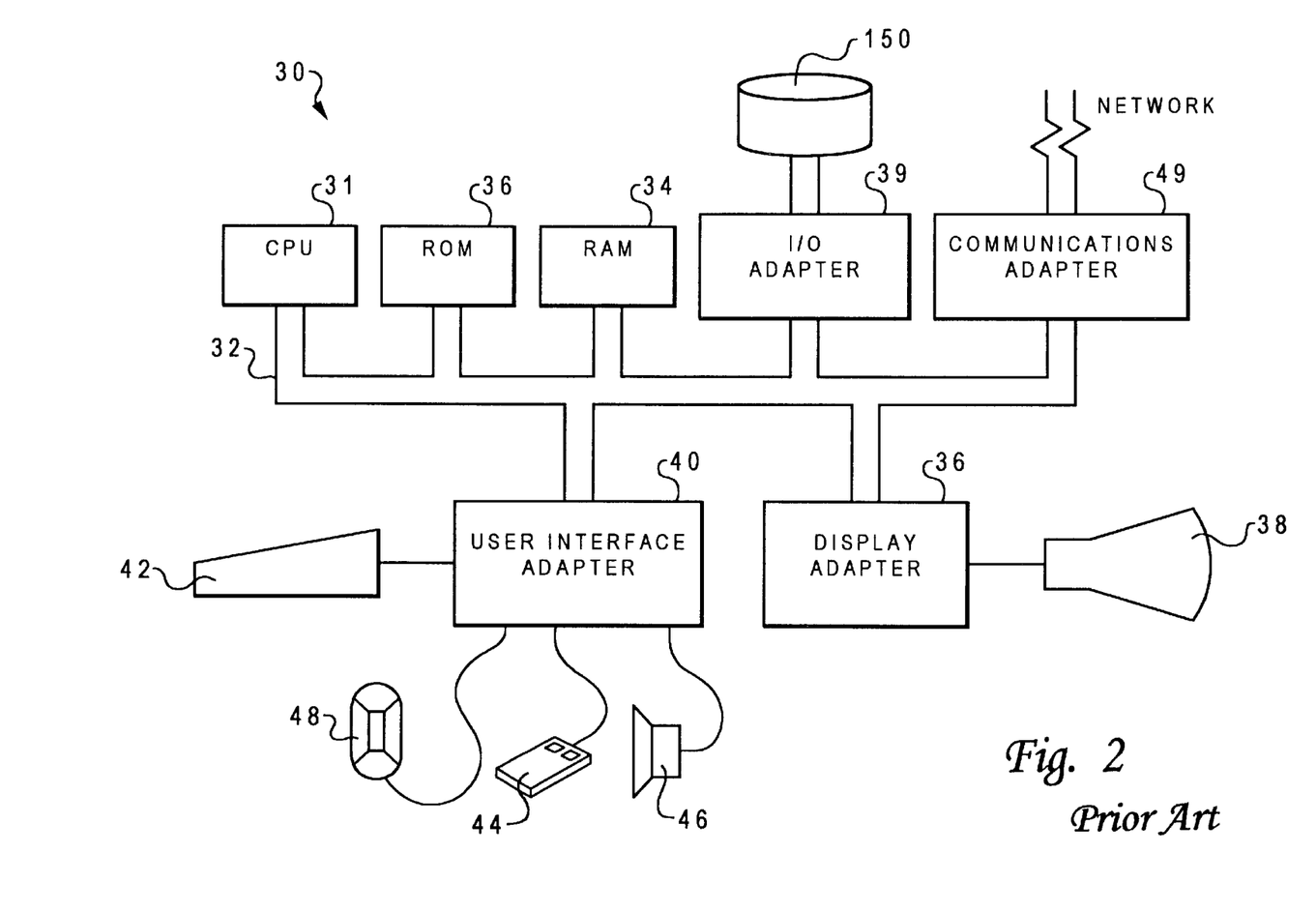
FIG. 2 is an illustration of a representative hardware environment which incorporates a graphical user interface which can be utilized in accordance with the method and system of the present invention.

FIG. 2 is an illustration of a representative hardware environment which incorporates a graphical user interface which can be utilized in accordance with the method and system of the present invention. FIG. 2 depicts a workstation 30 that includes a CPU (Central Processing Unit) 31, such as a conventional microprocessor, and a number of other units interconnected via system bus 32. Workstation 30 includes random access memory ("RAM") 34, read only memory ("ROM") 36, display adapter 36 for connecting system bus 32 to display device 38, and I/O adapter 39 for connecting peripheral devices (e.g., disk and tape drives 150) to system bus 32. Workstation 30 further includes user interface adapter 40 for connecting keyboard 42, mouse 44, speaker 46, microphone 48, and/or other user interface devices, such as a touch screen device (not shown), to system bus 32. Communication adapter 49 connects workstation 30 to a data processing network.

Workstation 30 also includes a graphical user interface (e.g., Motif Window Manager) that resides within a machine-readable media to direct the operation of workstation 30. Any suitable machine-readable media may retain the GUI, such as RAM 34, ROM 36, a magnetic diskette, magnetic tape, or optical disk (the last three being located in disk and tape drives 150). Any suitable operating system and associated graphical user interface (e.g., Microsoft Windows) may direct CPU 31. For example, the AIX operating system and AIXwindows windowing system (i.e., graphical user interface) can direct CPU 31. Other technologies can also be utilized in conjunction with CPU 31, such as touchscreen technology or human voice control.

Figure 3:
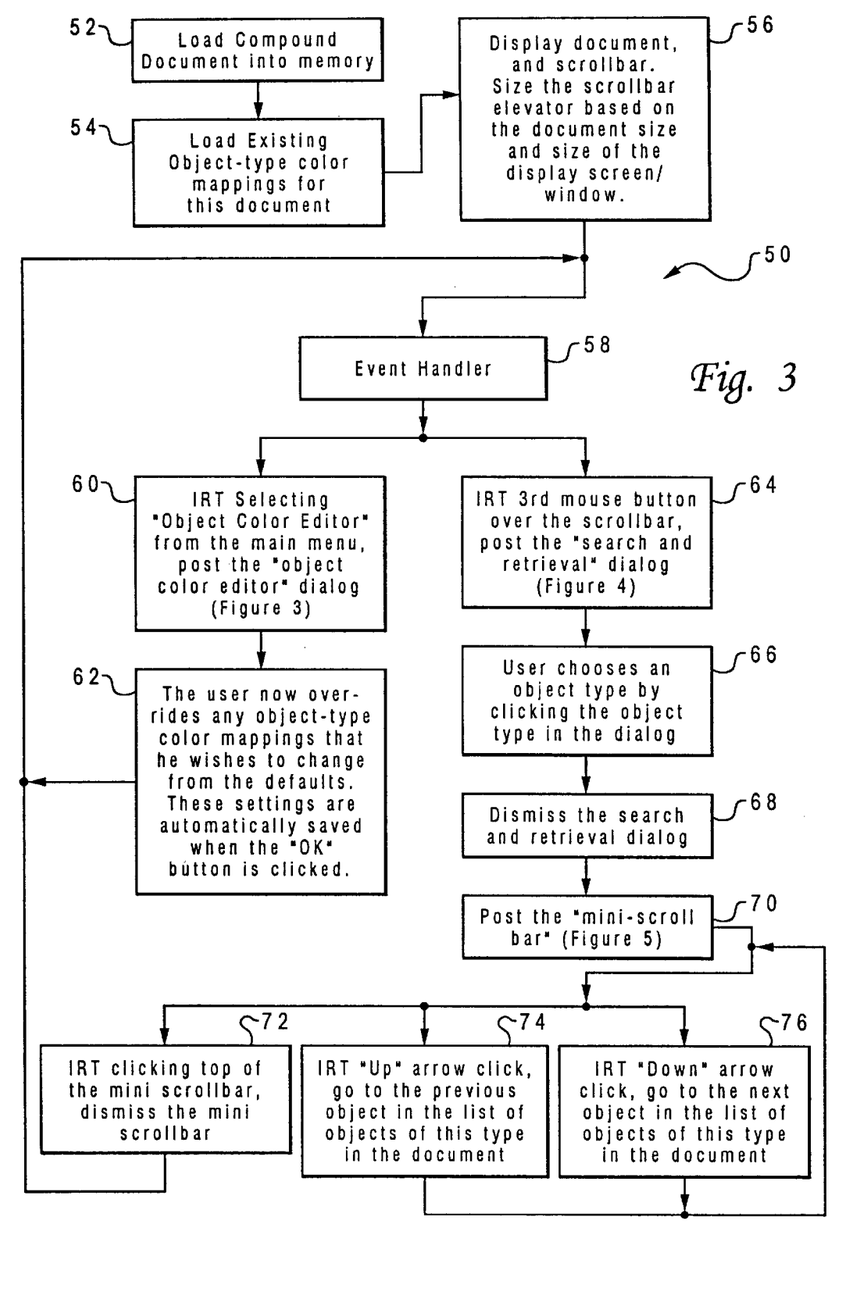
FIG. 3 illustrates a detailed logic flow chart illustrative of operations for a graphical user interface which can be utilized in accordance with the method and system of the present invention.

FIG. 3 illustrates a logic flow chart 50 illustrative of operations for a graphical user interface which can be utilized in accordance with the method and system of the present invention. As illustrated at block 52, in response to a user opening a compound document, the graphical user interface loads every page of the compound document from, for example, a hard disk drive, into RAM. Once in RAM, as illustrated at block 54, the graphical user interface loads existing object-type color mappings for the compound document. As described at block 56, the compound document is displayed, including a scroll bar. The scroll bar elevator is sized based on the size of the compound document and the sized of the display screen or window. As illustrated at block 58, an event handler awaits for input from the user to initiate a given chain of events. Two possible events can follow the event handler illustrated at bock 58.

Figure 4:
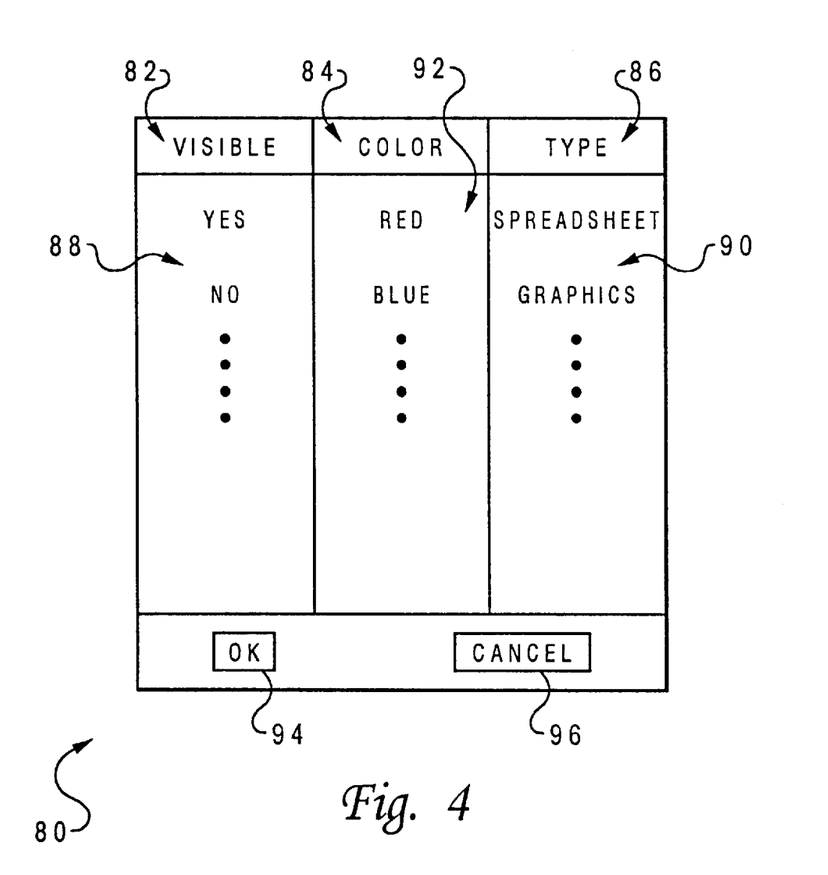
FIG. 4 depicts a graphical user interface window dialog box having informational and editing attributes which can be utilized in accordance with the method and system of the present invention.

First, as depicted at block 60, in response to a selection of an "object color editor" from a main menu, a dialog box representing an "object color editor" is posted (e.g., see FIG. 4 herein). As described at block 62, the user can over-ride any object-type color default mappings in order to change default color settings. The user can automatically save such settings by "clicking" with a pointing device (e.g., a mouse) an "OK" icon or button displayed in the graphical user interface environment.

Second, as described at bock 64, when the cursor is placed over the scroll bar and the third mouse button is pressed, a "search and retrieval" dialog box is posted. As depicted at block 66, the user selects an object type by clicking an object type in the "search and retrieval" dialog box, thus compiling a list of objects of that selected object type which can later be retrieved. As illustrated at block 68, the "search and retrieval" dialog box is dismissed. The relative location within the compound document of the first object in the compiled list of objects of the selected object type is also searched and identified for later utilization by the graphical user interface.

Then, as depicted at block 70, a "mini-scroll bar" is posted. The mini-scroll bar, in response to user controls contained within the mini-scroll bar, prompts the graphical user interface to automatically scroll to the relative location within the compound document of the aforementioned first object. Thus, when the user places a cursor in the mini-scroll bar with a mouse or other pointing device and "clicks" the mouse or other pointing device, the display screen is automatically scrolled to the relative location within the compound document of the first object in the aforementioned compiled list of objects of a specific object type. As illustrated at block 74, in response to clicking an "up" arrow with a mouse or other pointing device, the graphical user interface automatically scrolls within the compound document to the previous object in the compiled list of objects of a specific object type. As depicted at block 76, in response to clicking a "down" arrow with a mouse or other pointing device, the graphical user interface automatically scrolls within the compound document to the next object in the compiled list of objects of a specific object type. As depicted at block 72, in response to clicking the top of the mini-scroll bar, the mini-scroll bar is dismissed.

FIG. 4 depicts a graphical user interface window dialog box 80 having informational and editing attributes which can be utilized in accordance with the method and system of the present invention. Dialog box 80 functions as an object color editor which allows a user to associate colors with specific types of objects. A particular color can be chosen by default or modified to suit the needs of a user. A color 92 is designated in a column in dialog box 80 below a color heading 84. Below an object "type" heading 86 is a list 90 of specific types of objects. Each object in list 90 is associated with a color 92. For example, all spreadsheets within a given compound document can be designated by default as color red, or if the user desires, such default color settings can be altered. The dialog box prompts the user to enter such informational attributes. A heading 82 labeled "visible" is positioned above column 88. The user designates in column 88 whether a given color associated with a specific type of object will be displayed for later utilization by the user. Within dialog box 80 is an "OK" button and a "cancel" button which allow the user to verify or cancel the informational attributes entered into dialog box 80.

Figure 5A:
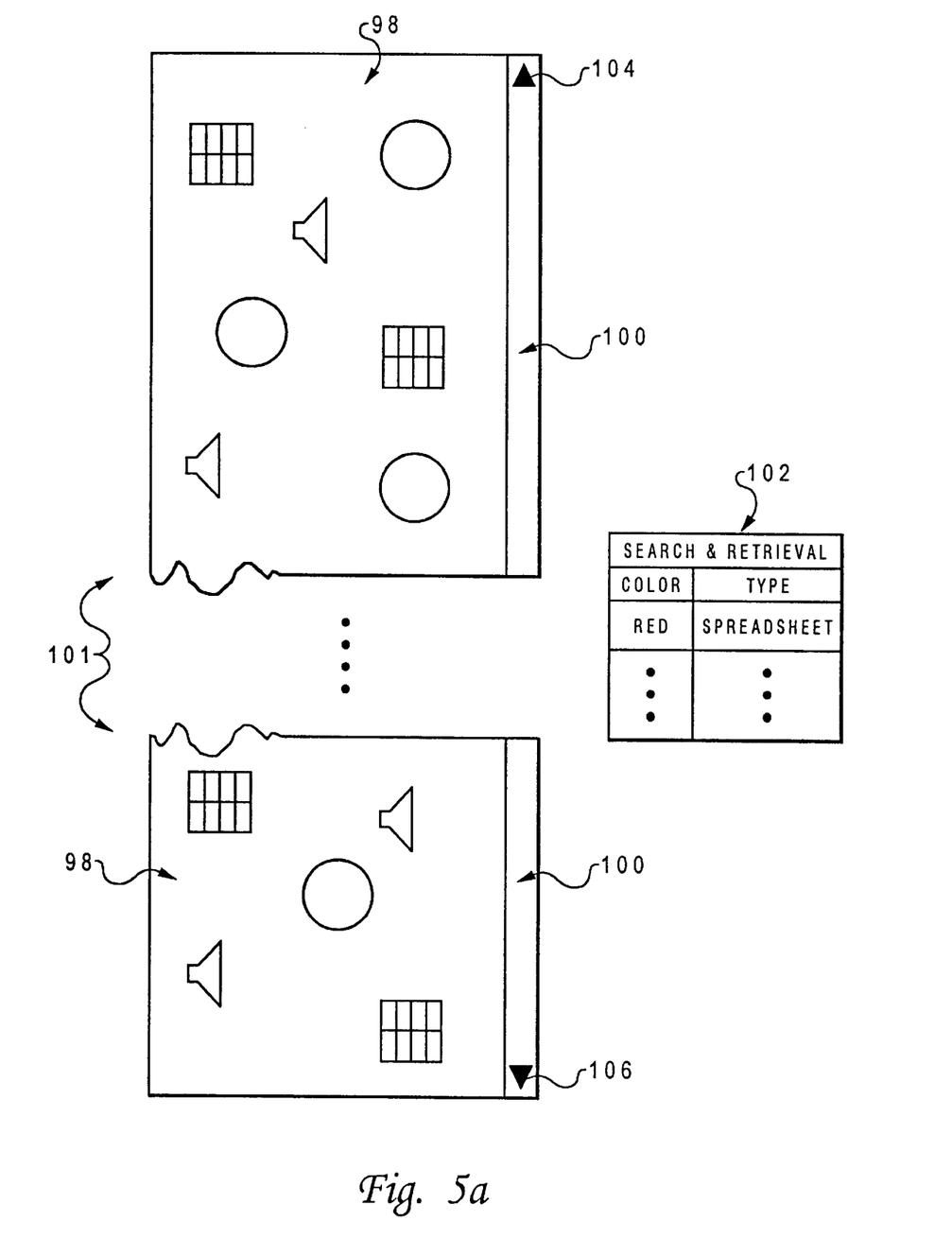
FIG. 5(a) depicts a graphical user interface window and dialog box which can be utilized in accordance with the method and system of the present invention.

FIG. 5(*a*) depicts a graphical user interface window 101 and dialog box 102 which can be utilized in accordance with the method and system of the present invention. Dialog box 102 is analogous to dialog box 80 of FIG. 4. However, dialog box 102 functions as a search and retrieval dialog box which allows the user to choose an object type by clicking an object type listed within dialog box 102. Window 101 includes a compound document which includes object of various types. A scroll bar 100 includes an "up" arrow 104 and a "down" arrow 106 for scrolling respectively upward or downward through compound document 98. The graphical user interface prompts a user to enter informational and editing attributes into dialog box 102. When the user enters such information and edition attributes (e.g., associated colors with object types), dialog box will vanish and a mini-scroll bar, which is not shown in FIG. 5(*a*), is displayed.

Figure 5B:
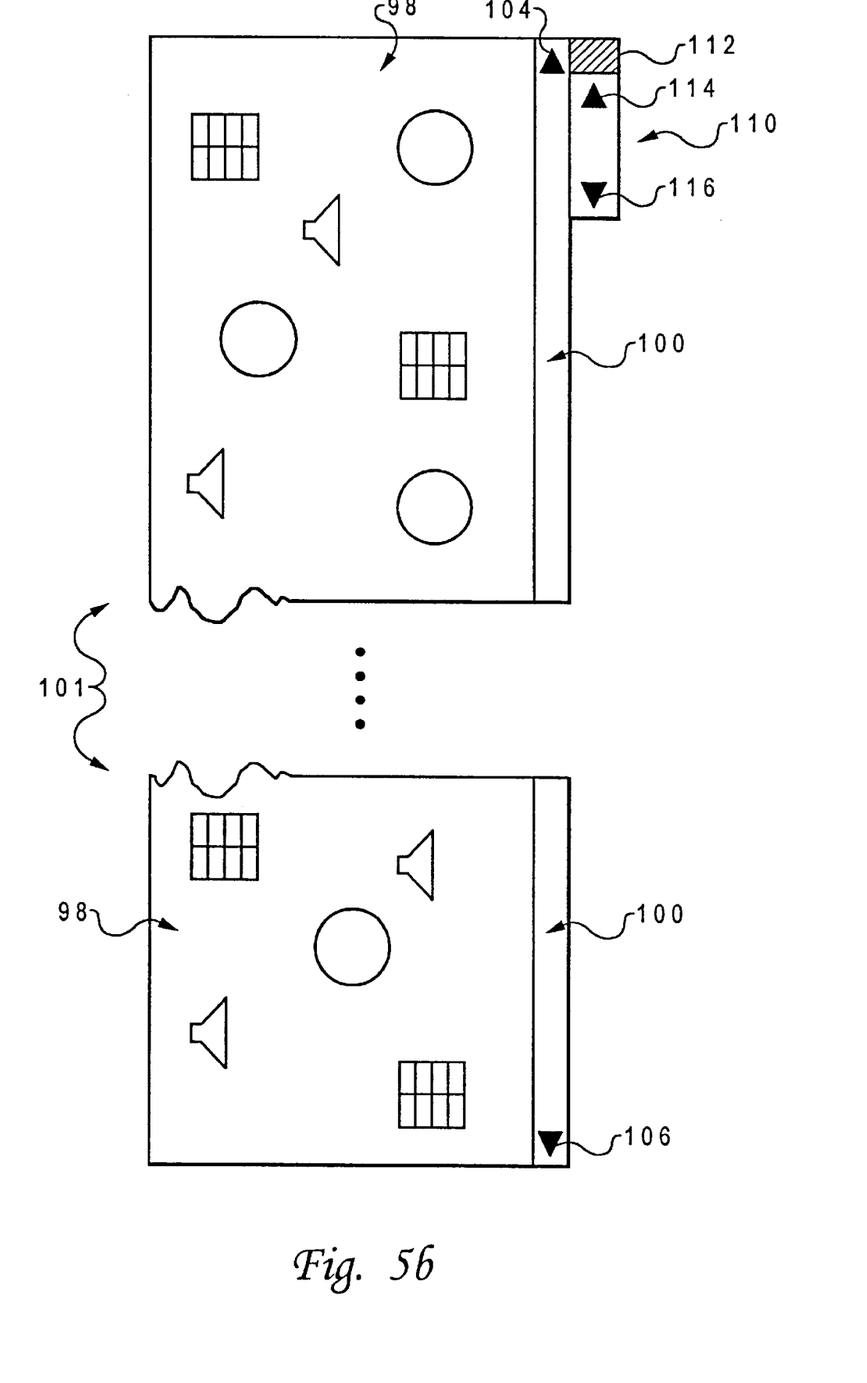
FIG. 5(b) depicts a graphical user interface window and mini-scroll bar which can be utilized in accordance with the method and system of the present invention.

FIG. 5(*b*) depicts a graphical user interface window 101 and mini-scroll bar 110 which can be utilized in accordance with the method and system of the present invention. Graphical user interface window 101 is the same window depicted in FIG. 5(*a*) following displacement of dialog box 102. When the user moves a cursor into mini-scroll bar 110 and clicks a mouse in an area of mini-scroll bar other than color box 112, up-arrow 114 and down-arrow 116, the graphical user interface automatically scrolls to the relative location within the compound document of the first object in the aforementioned compiled object list. The compiled object list is a list of objects of a specific object type contained within compound document 98 and which correspond to the color displayed within color box 112. The color within color box 112 is the color associated with a specific object type chosen by the user or by default.

Mini-scroll bar 110 includes user controls such as up-arrow 114 and down-arrow 116 which allow a user to scroll to a previous object of a specific object type or a next object of a specific object type. For example, the user can click up-arrow 114 to move to the previous object of the object type associated with the color in color box 112, or the user can click down-arrow 116 to move to the next object of the object type associated with the color in color box 112. The choice is left to the user. If the user desires not to scroll to the specific type of object associated with the color in color box 112, the user clicks color box 112 with a mouse or pointer. In response to clicking color box 112, mini-scroll bar vanishes. More than one mini-scroll bar may be positioned adjacent window 101. Only those mini-scroll bars earlier associated with the word "visible" in dialog box 80 of FIG. 4 will be posted adjacent window 101.

Figure 5C:
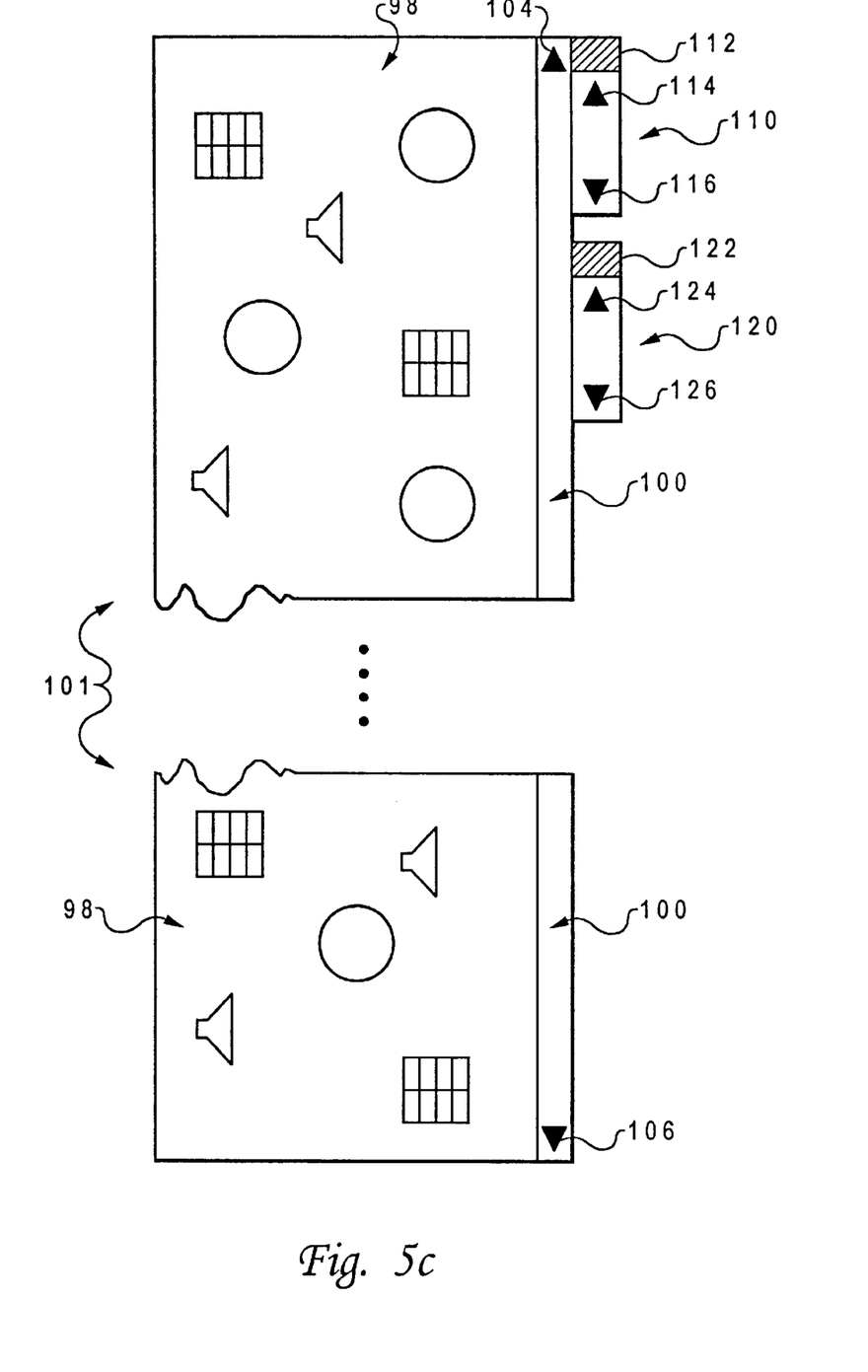
FIG. 5(c) depicts a graphical user interface window and multiple mini-scroll bars which can be utilized in accordance with the method and system of the present invention.

FIG. 5(*c*) depicts a graphical user interface window 101 with multiple mini-scroll bars which can be utilized in accordance with the method and system of the present invention. In FIG. 5(*a*), FIG. 5(*b*) and FIG. 5(*c*), like parts are indicated by like numbers. In the example depicted in FIG. 5(*c*), an additional mini-scroll bar 120 is displayed adjacent window 101. The color within color box 122 differs from the color within color box 112 of mini-scroll bar 110.

If a user moves the cursor out of mini-scroll bar 110 and into mini-scroll bar 120 and clicks the mouse, the screen automatically scrolls to the first object in a compiled list of objects of a specific object type which corresponds to the color displayed within color box 122 of mini-scroll bar 120. Mini-scroll bar 120 includes an up-arrow 124 and a down-arrow 126. When the user clicks down-arrow 126 the graphical user interface automatically scrolls to the second object in the compiled object list. When the user clicks down-arrow again 126, the graphical user interface automatically scrolls to the third object in the compiled list. Thereafter, if the user then clicks up-arrow 124, the graphical user interface automatically scrolls back to the first object (i.e., the previous object) in the compiled list of objects. If the user then moves the cursor out of mini-scroll bar 120 and back into mini-scroll bar 110 and clicks the mouse at an area of mini-scroll bar other than color box 112, up-arrow 114 or down-arrow 116, the graphical user interface automatically scrolls to the first object in the aforementioned compiled object type list. The color within color box 112 corresponds to a specific object type (e.g., spreadsheet).

While the invention has been shown and described with reference to particular embodiments thereof, it will be understood by those skilled in the art that the foregoing and other changes in form and detail may be made therein without departing from the spirit and scope of the invention, which is defined only by the following claims. For example, instead of using the mouse events to create or delete objects, keyboard key sequences could be devised that have equivalent functional results.

What is claimed is:

1. A method in a data processing system for retrieving specific types of objects contained within a compound document displayed in a graphical user interface environment within said data processing system, comprising the steps of:

displaying a dialog box within said graphical user interface environment wherein said dialog box includes a listing of object types, in response to user input, wherein each object type is associated with a particular color;

selecting an object type from among said listing of object types;

dynamically searching for the relative location of a first object of said selected object type from among a sequential plurality of objects of said selected object type contained within said compound document, in response to said selection; and automatically scrolling to the relative location within said compound document of said first object of said selected object type, in response to user controls, based on a particular color associated with said first object.

2. The method of claim 1 further comprising the step of:

automatically scrolling to the relative location within said compound document of a next or previous object of said selected object type among said sequential plurality of objects of said selected object type, in response to user controls, wherein said next or previous object of said selected object type among said sequential plurality of objects of said selected object type is associated with said particular color.

3. The method of claim 2 further comprising the step of:

displaying a dialog box within said graphical user interface environment wherein said dialog box includes a listing of object types, wherein each object type is associated with a particular color, in response to a default parameter.

4. The method of claim 3 further comprising the step of altering a color associated with each object type, in response to user input.

5. The method of claim 4 wherein the step of automatically scrolling to the relative location within said compound document of a next or previous object of said selected object type among said sequential plurality of objects of said selected object type, in response to user controls, wherein said next or previous object of said selected object type among said sequential plurality of objects of said selected object type is associated with said particular color, further comprises the step of:

automatically scrolling to the relative location within said compound document of a next or previous object of said selected object type among said sequential plurality of objects of said selected object type, in response to user input at a mini-scroll bar, wherein said next or previous object of said selected object type among said sequential plurality of objects of said selected object type is associated with a particular color displayed within said mini-scroll bar.

6. A data processing system for retrieving specific types of objects contained within a compound document displayed in a graphical user interface environment within said data processing system, comprising the steps of:

means for displaying a dialog box within said graphical user interface environment wherein said dialog box includes a listing of object types, in response to user input, wherein each object type is associated with a particular color;

means for selecting an object type from among said listing of object types;

means for dynamically searching for the relative location of a first object of said selected object type from among a sequential plurality of objects of said selected object type contained within said compound documents, in response to said selection; and means for automatically scrolling to the relative location within said compound document of said first object of said selected object type, in response to user controls, based on a particular color associated with said first object.

7. The data processing system of claim 6 further comprising:

means for automatically scrolling to the relative location within said compound document of a next or previous object of said selected object type among said sequential plurality of objects of said selected object type, in response to user controls, wherein said next or previous object of said selected object type among said sequential plurality of objects of said selected object type is associated with said particular color.

8. The data processing system of claim 7 further comprising:

means for displaying a dialog box within said graphical user interface environment wherein said dialog box includes a listing of object types, wherein each object type is associated with a particular color, in response to a default parameter.

9. The data-processing system of claim 8 further comprising:

means for altering said color associated with each object type, in response to user input.

10. The system of claim 9 wherein said means for automatically scrolling to the relative location within said compound document of a next or previous object of said selected object type among said sequential plurality of objects of said selected object type, in response to user controls, wherein said next or previous object of said selected object type among said sequential plurality of objects of said selected object type is associated with said particular color, further comprises:

means for automatically scrolling to the relative location within said compound document of a next or previous object of said selected object type among said sequential plurality of objects of said selected object type, in response to user input at a mini-scroll bar, wherein said next or previous object of said selected object type among said sequential plurality of objects of said selected object type is associated with a particular color displayed within said mini-scroll bar.

11. A computer program product residing in computer memory in a data processing system for permitting a user to retrieve specific types of objects contained within a compound document displayed in a graphical user interface environment within said data processing system, said computer program product comprising:

instruction means residing in a computer for displaying a dialog box within said graphical user interface environment wherein said dialog box includes a listing of object types, in response to user input, wherein each object type is associated with a particular color;

instruction means residing in a computer for selecting an object type from among said listing of object types, wherein said object type is associated with a particular color;

instruction means residing in a computer for dynamically searching for the relative location of a first object of said selected object type from among a sequential plurality of objects of said selected object type contained within said compound document, in response to said selection; and     instruction means residing in a computer for automatically scrolling to the relative location within said compound document of said first object of said selected object type, in response to user controls, based on a particular color associated with said first object.

12. The computer program product of claim 11 further comprising:

instruction means residing in a computer for automatically scrolling to the relative location within said compound document of a next or previous object of said selected object type among said sequential plurality of objects of said selected object type, in response to user controls, wherein said next or previous object of said selected object type among said sequential plurality of objects of said selected object type is associated with said particular color.

13. The computer program product of claim 12 further comprising:

instruction means residing in a computer for displaying a dialog box within said graphical user interface environment wherein said dialog box includes a listing of object types, wherein each object type is associated with a particular color, in response to a default parameter.

14. The computer program product of claim 13 further comprising:

instruction means residing in a computer for altering said color associated with each object type, in response to user input.

15. The computer program product of claim 14 wherein each of said instruction means further comprises signal-bearing media.

16. The computer program product of claim 15 wherein said signal-bearing media further comprises transmission media.

17. The computer program product of claim 15 wherein said signal-bearing media further comprises recordable media.

18. The computer program product of claim 15 wherein said instruction means residing in a computer for automatically scrolling to the relative location within said compound document of a next or previous object of said selected object type among said sequential plurality of objects of said selected object type, in response to user controls, wherein said next or previous object of said selected object type among said sequential plurality of objects of said selected object type is associated with said particular color, further comprises:

instruction means residing in a computer for automatically scrolling to the relative location within said compound document of a next or previous object of said selected object type among said sequential plurality of objects of said selected object type, in response to user input at a mini-scroll bar, wherein said next or previous object of said selected object type among said sequential plurality of objects of said selected object type is associated with a particular color displayed within said mini-scroll bar.

19. A method in a data-processing system for retrieving specific types of objects contained within a compound document displayed in a graphical user interface environment within said data-processing system, comprising the steps of:

displaying a dialog box within said graphical user interface environment wherein said dialog box includes a listing of object types, in response to user input, wherein each object type is associated with a particular color;

selecting an object type from among said listing of object types, wherein said object type is associated with a particular color;

dynamically searching for the relative location of a first object of said selected object type from among a sequential plurality of objects of said selected object type contained within said compound document, in response to said selection;

automatically scrolling to the relative location within said compound document of said first object of said selected object type, in response to user controls, based on a particular color associated with said first object; and     automatically scrolling to the relative location within said compound document of a next or previous object of said selected object type among said sequential plurality of objects of said selected object type, in response to user controls, wherein said next or previous object of said selected object type among said sequential plurality of objects of said selected object type is associated with said particular color.

\* \* \* \* \*